(No Model.)
L. L. LEWIS.
TUBULAR INSERTED SAW TOOTH.
No. 485,503. Patented Nov. 1, 1892.
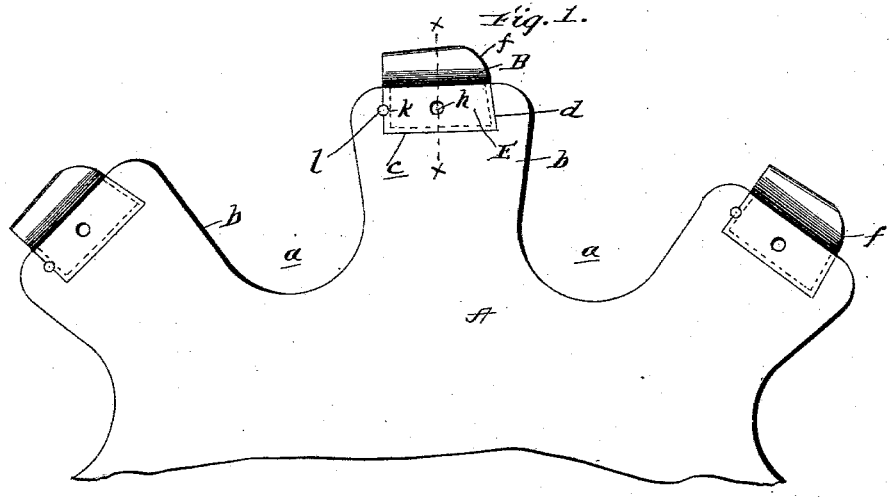
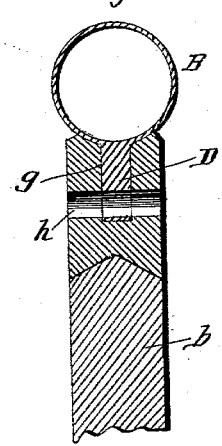
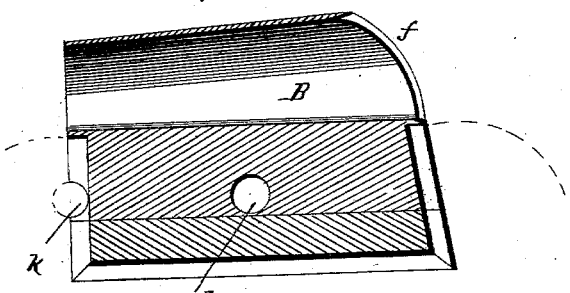
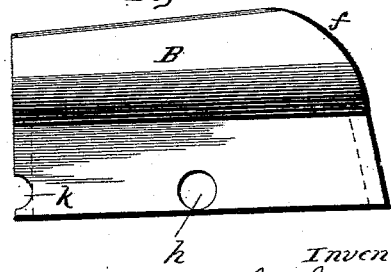
Witnesses:
C. H. Raeder
H. F. Matthews
Inventor
Lorenzo L. Lewis
By James J. Sheehy
Attorney

UNITED STATES PATENT OFFICE.

LORENZO LIVINGSTON LEWIS, OF ORANGE CITY, FLORIDA, ASSIGNOR OF ONE-HALF TO RICHARD D. COULTER, OF SAME PLACE.

TUBULAR INSERTED SAW-TOOTH.

SPECIFICATION forming part of Letters Patent No. 485,503, dated November 1, 1892.

Application filed October 23, 1891. Serial No. 409,605. (No model.)

*To all whom it may concern:*

Be it known that I, LORENZO LIVINGSTON LEWIS, a citizen of the United States, residing at Orange City, in the county of Volusia and State of Florida, have invented certain new and useful Improvements in Tubular Inserted Saw-Teeth; and I do declare the following to be a full, clear, and exact description of the invention, such as will enable others skilled in the art to which it appertains to make and use the same.

This invention relates to an improvement in insertible saw-teeth; and it consists, broadly, in an insertible tooth of a tubular form.

The invention further consists in the construction of an insertible saw-tooth of a tubular form which will afford great clearance, afford but little friction or resistance to the action of the saw, and offer no obstruction to the free passage and discharge of the sawdust and shavings.

Other advantages of the construction illustrated will appear from the following description and claims, when taken in connection with the accompanying drawings, in which—

Figure 1 is a side view of a portion of a circular saw, showing three of my improved teeth in position. Fig. 2 is a sectional view taken in the plane indicated by the dotted line $x\ x$ on Fig. 1. Fig. 3 is a vertical longitudinal central sectional view of the tooth and its attaching flange or base, and Fig. 4 is a side view of the same.

Before describing the details of construction I desire to say that I am well aware that it is not new to provide a circular saw or other saw with smoothing bits or blades which will smooth the sides of a saw-kerf while it is being formed by the saw, so as to produce lumber sufficiently planed for most purposes without further or additional planing after a log has been reduced to boards, such planed bits being preferably arranged on the blade so as to alternate with the teeth, and I am also aware that rotary cutters have been provided in which a body having a portion of its periphery of less curvature than the remaining portion has been provided with a groove or channel and a cutting-blade arranged so as to extend across the groove and secured to the sides of the body, and I would have it understood that my invention differs from such devices in that the tooth itself is tubular and is adapted to serve in connection with a blade of any suitable shape without special provision and should not be understood as a planer to be used in connection with other saw-teeth.

Referring by letter to the said drawings, A indicates a portion of a circular saw. This saw is provided at suitable intervals in its periphery with recesses $a$, and between these recesses the extended parts $b$ are provided for receiving the insertible teeth. The parts $b$ are respectively provided with transverse openings $c$ for the reception of the brass or other metal base carrying the tubular teeth. These openings are provided with a forward-inclined wall $d$ and all of the walls of said recess are beveled from a central point in the thickness of the blade to opposite sides, as better shown in Fig. 2 of the drawings, and the tooth or, rather, its brass or other metal holder, is correspondingly grooved or channeled to receive the beveled walls of the opening.

B indicates the insertible tooth. This tooth is of a tubular form having its forward edge $f$ sloping or beveled rearwardly, as shown, and the diameter of the hollow or tube is slightly less but deeper at the upper side of the rear than at the forward or cutting edge, so as to afford clearance during operation and prevent any tendency to bind. This tooth is preferably composed of hard steel between the hardness of a chisel and a spring, so as to take a good edge, but not crumble or break, and the flange or stem D, which is formed integral, although it may be fixed to the tubular portion in any suitable manner, is of a flat contour and projects from the lower side of the tube in a longitudinal position, so that it may enter a recess or slot in the brass or other metal E. This brass or other metal E has a slot $g$ throughout its length in its vertical center to receive the flange or attaching portion D of the tooth, and said attaching portion is welded or otherwise suitably fixed in the slot of the brass E. The brass E is provided with a central transverse hole $h$ for the insertion of a punch or other suitable implement when seating said brass and its bearing-tooth in the opening of the saw-blade. The brass is also provided in its rear vertical wall or edge with a semicircular groove $k$, which, together with a corresponding groove $l$ in the rear wall of said opening, forms a hole of circular form to receive a locking key or rivet.

In operation after the tubular tooth has been fixed in its brass or iron base and it is desirable to insert the same in the opening of the saw-blade it is simply necessary to place the channel portion of the front and rear ends of the brass base so as to receive the bevel or correspondingly shaped projection in forward and rear walls of the opening, and after it has been inserted sufficiently tight by hand it can be more firmly seated by placing a punch or the like in the hole $h$ and driving the brass home. The semicircular grooves $k$ and $l$ having been brought to meet, a key or rivet is then inserted in the hole formed thereby, when the tooth and its bearing-brass will be firmly held in the blade and prevented from misplacement in any direction.

By the employment of the recesses $a$ at the rear of each tooth I provide a means for carrying off shavings and sawdust as they pass out of the tubular or hollow tooth.

While I have described the tooth of the exact construction shown and the means precisely as shown for securing the same to the blade, yet I do not wish to be understood as limiting myself to such exact construction, as, so far as I am aware, I am the first to ever provide a tubular tooth to be placed in circular or other saws.

Having described my invention, what I claim is—

1. As an improved article of manufacture, a saw having only tubular saw-teeth, substantially as specified.

2. A saw having only tubular teeth, which teeth have their forward or cutting edges beveled rearwardly and their rear ends of less diameter but deeper than their cutting ends or edges, substantially as specified.

3. The tubular saw-tooth having the attaching-flange, in combination with a slotted brass receiving said flange and adapted to be secured in the opening of a saw-blade, substantially as specified.

4. A circular saw-blade having the alternate recesses and projections in its periphery and the projections having openings to receive insertible teeth, one wall of the opening being pitched or inclined and the opposite wall provided with a key-groove, in combination with an insertible tubular or hollow tooth having an attaching-flange and a slotted brass receiving said flange and also having a key-groove, and a key adapted to enter said grooves and lock the tooth in the blade, substantially as specified.

In testimony whereof I affix my signature in presence of two witnesses.

LORENZO LIVINGSTON LEWIS.

Witnesses:
JNO. E. STILLMAN,
F. C. GRAHAM.